United States Patent
Pal

(10) Patent No.: US 9,369,282 B2
(45) Date of Patent: Jun. 14, 2016

(54) MOBILE DEVICE USER AUTHENTICATION FOR ACCESSING PROTECTED NETWORK RESOURCES

(71) Applicant: Red Hat, Inc., Raleigh, NC (US)

(72) Inventor: Dmitri Pal, Framingham, MA (US)

(73) Assignee: Red Hat, Inc., Raleigh, NC (US)

( * ) Notice: Subject to any disclaimer, the term of this patent is extended or adjusted under 35 U.S.C. 154(b) by 1 day.

(21) Appl. No.: 14/166,935

(22) Filed: Jan. 29, 2014

(65) Prior Publication Data
US 2015/0215128 A1 Jul. 30, 2015

(51) Int. Cl.
*H04L 29/06* (2006.01)
*H04L 9/32* (2006.01)

(52) U.S. Cl.
CPC ............ *H04L 9/3213* (2013.01); *H04L 9/3228* (2013.01); *H04L 9/3234* (2013.01); *H04L 63/0807* (2013.01); *H04L 63/0815* (2013.01); *H04L 63/0823* (2013.01); *H04L 63/0838* (2013.01); *H04L 63/0884* (2013.01); *H04L 63/10* (2013.01); *H04L 2209/80* (2013.01)

(58) Field of Classification Search
CPC ............ H04L 2209/80; H04L 2209/76; H04L 63/0807
USPC .................................. 713/155, 171; 455/411
See application file for complete search history.

(56) References Cited

U.S. PATENT DOCUMENTS

| | | | |
|---|---|---|---|
| 8,433,288 B2 | 4/2013 | Frew et al. | |
| 8,516,566 B2 | 8/2013 | Srinivas | |
| 8,739,266 B2* | 5/2014 | Buer | G06F 21/34 713/172 |
| 2008/0200147 A1* | 8/2008 | Nylander et al. | 455/411 |
| 2010/0293381 A1* | 11/2010 | Hammad | 713/172 |
| 2011/0219439 A1 | 9/2011 | Strode et al. | |
| 2012/0031969 A1* | 2/2012 | Hammad | 235/380 |
| 2012/0214443 A1 | 8/2012 | Daigle | |
| 2013/0212385 A1* | 8/2013 | Schechter et al. | 713/168 |
| 2013/0227291 A1* | 8/2013 | Ahmed | H04L 63/0281 713/171 |
| 2014/0298441 A1* | 10/2014 | Yamaguchi et al. | 726/8 |

FOREIGN PATENT DOCUMENTS

EP 2632108 8/2013

OTHER PUBLICATIONS

Wang, "Security Analysis of a Single Sign-On Mechanism for Distributed Computer Networks", Feb. 2013, IEEE, vol. 9, p. 294-302.*

(Continued)

*Primary Examiner* — Thanhnga B Truong
*Assistant Examiner* — Gregory Lane
(74) *Attorney, Agent, or Firm* — Lowenstein Sandler LLP

(57) ABSTRACT

Systems and methods for strong user authentication for accessing protected applications by mobile computing devices. An example method may comprise: receiving, by a mobile computing device, a cryptographic nonce via a first communication interface; transmitting, via a second communication interface, an authentication request using the cryptographic nonce, to an authentication server via an HTTP proxy server; receiving a resource access token from the authentication server; and transmitting a computing resource access request using the resource access token.

17 Claims, 5 Drawing Sheets

(56) References Cited

OTHER PUBLICATIONS

Alkatheiri, Mohammed Saeed, et al., "BAN Logic-Based Security Proof for Mobile OTP Authentication Scheme", Future Information Technology, Application and Service, Lecture Notes in Electrical Engineering, 164:53-59, 2012 http://link.springer.com/chapter/10.1007/978-94-007-4516-2_6.

"Authentication Challenges in a Mobile World", Blitzer Mobile, pp. 1-4, 2012 http://www.bitzermobile.com/wp-content/uploads/2012/03/Authentication_Challenges_BMAX-SA_whitepaper.pdf.

"Google Authenticator for Multi-factor Authentication", LWN.net, 10 Pages, Dec. 7, 2011 http://lwn.net/Articles/470764/.

Patil, Sandeep Ramesh, "Implement Two-factor Authentication for AIX Using Kerberos", IBM, 5 Pages, Nov. 4, 2008 http://www.ibm.com/developerworks/aix/library/au-twofactors/.

Sathyan, Jithesh and Sadasivan, Manesh, "Multi-Layered Collaborative Approach to Address Enterprise Mobile Security Challenges", IEEE, 6 Pages, 2010 http://ieeexplore.ieee.org/xpl/login.jsp?tp=&arnumber=5730691&url=http%3A%2F%2Fieeexplore.ieee.org%2Fxpls%2Fabs_all.jsp%3Farnumber=5730691.

"Securely Connecting Smartphones and Tablets to the Enterprise", Intel IT, pp. 1-8, Mar. 2013 http://www.intel.in/content/dam/www/public/us/en/documents/best-practices/securely-connecting-smartphones-and-tablets-to-the-enterprise.pdf.

* cited by examiner

MOBILE DEVICE USER AUTHENTICATION FOR ACCESSING PROTECTED NETWORK RESOURCES

TECHNICAL FIELD

The present disclosure is generally related to distributed computer systems, and is more specifically related to systems and methods for authenticating mobile device users accessing protected network resources.

BACKGROUND

Multi-factor authentication is an authentication method that requires the entity seeking to be the authenticated (e.g., a computer system user) to present two or more of the three basic authentication factors: the knowledge factor ("something only the user knows"), the possession factor ("something only the user has"), and the inherence factor ("something only the user is"). The more factors are employed by the authentication process, the higher is the probability that the user indeed possesses the asserted identity. Two-factor authentication is commonly employed in computer authentication, where the user may be required to supply a set of credentials covering the knowledge factor and the possession factor (e.g., a user password and a one-time code), or the knowledge factor and the inherence factor (e.g., a user password and a biometric input).

While multi-factor authentication is commonly regarded as strong authentication, other strong authentication varieties are known. In other words, strong authentication does not have to be multi-factor authentication. In an illustrative example, soliciting answers to multiple challenge questions may be regarded as a strong authentication method, but not multi-factor authentication, since multiple knowledge factors are provided. In another illustrative example, an authentication method which does not involve transmitting the password provides strong authentication.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
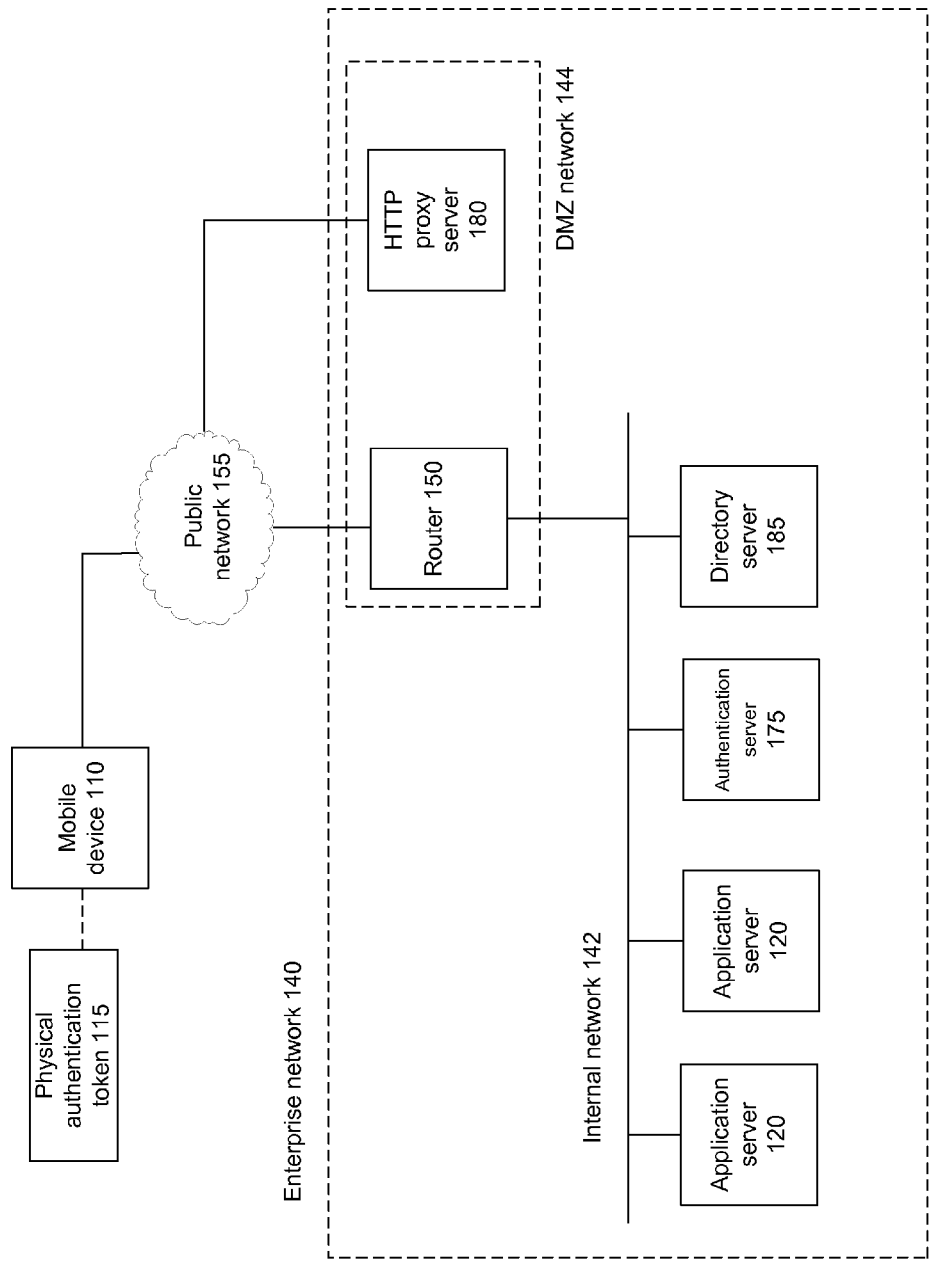
FIG. 1 depicts a high-level component diagram of an example distributed computer system 100 in accordance with one or more aspects of the present disclosure.

Described herein are methods and systems for authenticating mobile device users accessing computing resources residing within protected environments (e.g., applications and/or data residing on enterprise networks).

In certain implementations, computing resources residing on an enterprise network may be accessible over a virtual private network. "Virtual private network" (VPN) herein shall refer to means for establishing protected communication sessions between a remote client device or system and a core network (e.g., an enterprise network), and/or to such protected communication sessions. A client program (referred to as a VPN client) running on a user's computer system may establish one or more encrypted communication sessions with a VPN server, and thus allow the user to securely access computing resources which reside on a protected network (such as an enterprise network). However, using VPN access may be impractical for mobile computing devices, since a VPN client for accessing a given vendor's VPN server may not always be available for a particular mobile device platform.

Other conventional methods for authenticating mobile device users accessing computing resources residing on a protected network employ passwords, keys, and/or digital certificates which may be saved on the mobile device itself. However, saving a key or a digital certificate on the mobile device effectively eliminates one factor from the user authentication scheme that otherwise might be considered as multi-factor. Employing external physical authentication tokens to store keys and/or digital certificates may render the authentication scheme two-factor, but the user will need to authenticate to every computing resource to be accessed, as conventional password-based or digital certificate-based authentication methods do not allow for a single sign on to a plurality of protected resources.

The methods and systems disclosed herein address the above noted and other deficiencies by allowing mobile computing devices to be used for securely accessing computing resources residing within protected environments (e.g., enterprise network applications), without storing any long-term authentication keys on the mobile computing device, while providing strong user authentication and single sign-on to a plurality of protected computing resources.

In accordance with one or more aspects of the present disclosure, a mobile computing device may input, via a near field communication (NFC) or other suitable communication interface, a cryptographic nonce supplied by a physical token (e.g., a YubiKey device). "Cryptographic nonce" herein shall refer to an arbitrary bit sequence represented, e.g., by a random or a pseudo-random number, a one-time password, or a short-lived certificate.

As the physical token configured to supply the nonce is presumed to be in the user's exclusive possession, using the nonce in combination with a user identifier and the user's password (the latter two may be required for the user's access to the mobile computing device) provides a strong authentication mechanism based on two factors (possession factor and knowledge factor).

The cryptographic nonce may be used by the mobile computing device for authenticating to an authentication serer (e.g., a Kerberos server). In an illustrative example, the authentication request may be tunneled within one or more HTTP requests transmitted to an HTTP proxy server. Using HTTP transport allows securing the transmission over a public network by employing a TLS/SSL secure connection to the HTTP proxy server.

Responsive to successfully authenticating to the authentication server using the cryptographic nonce, the mobile computing device may receive a resource access token which may then be used for requesting access to computing resources residing within a protected environment. In an illustrative example, the mobile computing device may receive a ticket granting ticket (TGT) from the authentication server, and use the TGT to acquire a service ticket to access a particular protected resource, as described in more details herein above.

Various aspects of the above referenced methods and systems are described in details herein below by way of examples, rather than by way of limitation.

FIG. 1 depicts a high-level component diagram of an illustrative example of a distributed computer system 100 in accordance with one or more aspects of the present disclosure. "Computer system" herein shall refer to a system comprising one or more processors, one or more memory devices, and one or more communication interfaces. Distributed computer system 100 may comprise one or more computer systems interconnected by one or more networks.

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). "Memory device" herein shall refer to a volatile or non-volatile memory device, such as RAM, ROM, EEPROM, or any other device capable of storing data. "Communication interface" herein shall refer to circuitry or device communicatively coupled to one or more processors and capable of routing data between the processors and one or more external devices.

As schematically illustrated by FIG. 1, distributed system 100 may comprise a mobile computing device 110 accessing, over one or more public networks 155, computing resources of one or more enterprise computer systems (e.g., application servers) 120 residing on an enterprise network 140. The latter may comprise physical servers and/or virtual machines, raw and file-based storage, routers, firewalls, and/or load balancers interconnected by two or more LANs. While in the illustrative example of FIG. 1 enterprise network 140 is shown as comprising an internal network 142 and a demilitarized zone (DMZ) network 144, in other implementations, enterprise network 140 may comprise various other network topologies, including two or more internal networks and/or two or more DMZ networks.

Enterprise network 140 may be interconnected to a public network 155 (e.g., the Internet) via a router 150. Enterprise network 140 may further comprise a directory server 185 designed to provide distributed directory information services by storing an organized set of records representing various entities, including users, user groups, organizations, etc. In certain implementations, directory server 185 may implement Lightweight Directory Access Protocol (LDAP).

Enterprise network 140 may further comprise an authentication server 175. While in the illustrative example of FIG. 1 authentication server 175 is shown as running on a dedicated hardware server, in other implementations authentication server 175 may be collocated with other functional components of enterprise network 140 (e.g., with directory server 185).

In certain implementations, authentication server 175 may implement Kerberos authentication protocol designed to allow computer systems communicating over a non-secure network to prove their identity to each other in a secure manner. Kerberos protocol messages are protected against eavesdropping and replay attacks.

In an illustrative example, a mobile computing device 110 may request a user to provide login credentials responsive to the device being reset or powered up. As the device may be locked responsive to an explicit user interface action or an expiration of a pre-defined inactivity timeout, the user login credentials may also be required to unlock the device. The user login credentials may comprise the user's identifier and the user's password.

Responsive to a user's bringing a physical authentication token 115 (e.g., a YubiKey device) within the communication range of a near field communication (NFC) or other suitable communication interface (e.g., a Bluetooth interface or an infrared interface) of mobile computing device 110, the latter may receive a cryptographic nonce supplied by the physical authentication token. In an illustrative example, the nonce may be represented by a one-time password based on a secret shared by physical authentication token 115 and authentication server 175, so that the latter would be able to validate the nonce presented by the mobile computing device for authentication.

In an illustrative example, mobile communication device 110 may transmit the authentication request to HTTP proxy server 180 via a secure SSL connection, so that the client-server message exchange between mobile computing device 110 and authentication server 175 described herein may be performed over a public network. HTTP proxy server 180 may transparently forward requests and responses to authentication server 175 and to mobile computing device 110, respectively.

In certain implementations, the authentication request may comprise the cryptographic nonce received from the physical authentication token. Alternatively, the authentication request may comprise an entity derived from the cryptographic nonce (e.g., by applying a pre-defined function to the cryptographic nonce).

In certain implementations, authentication server 175 may perform the functionality of Kerberos Key Distribution Center (KDC). In an illustrative example, authentication server 175 may implement the One-Time Password Pre-Authentication Protocol, as described in RFC-6560 "One-Time Password (OTP) Pre-Authentication."

Authentication server 175 may issue a single sign-on authentication token, also referred to as Ticket Granting Ticket (TGT), to mobile computing device 110. The latter may then use the TGT to get access to the computing resources residing on enterprise network 142, as described in more details herein below.

Figure 2:
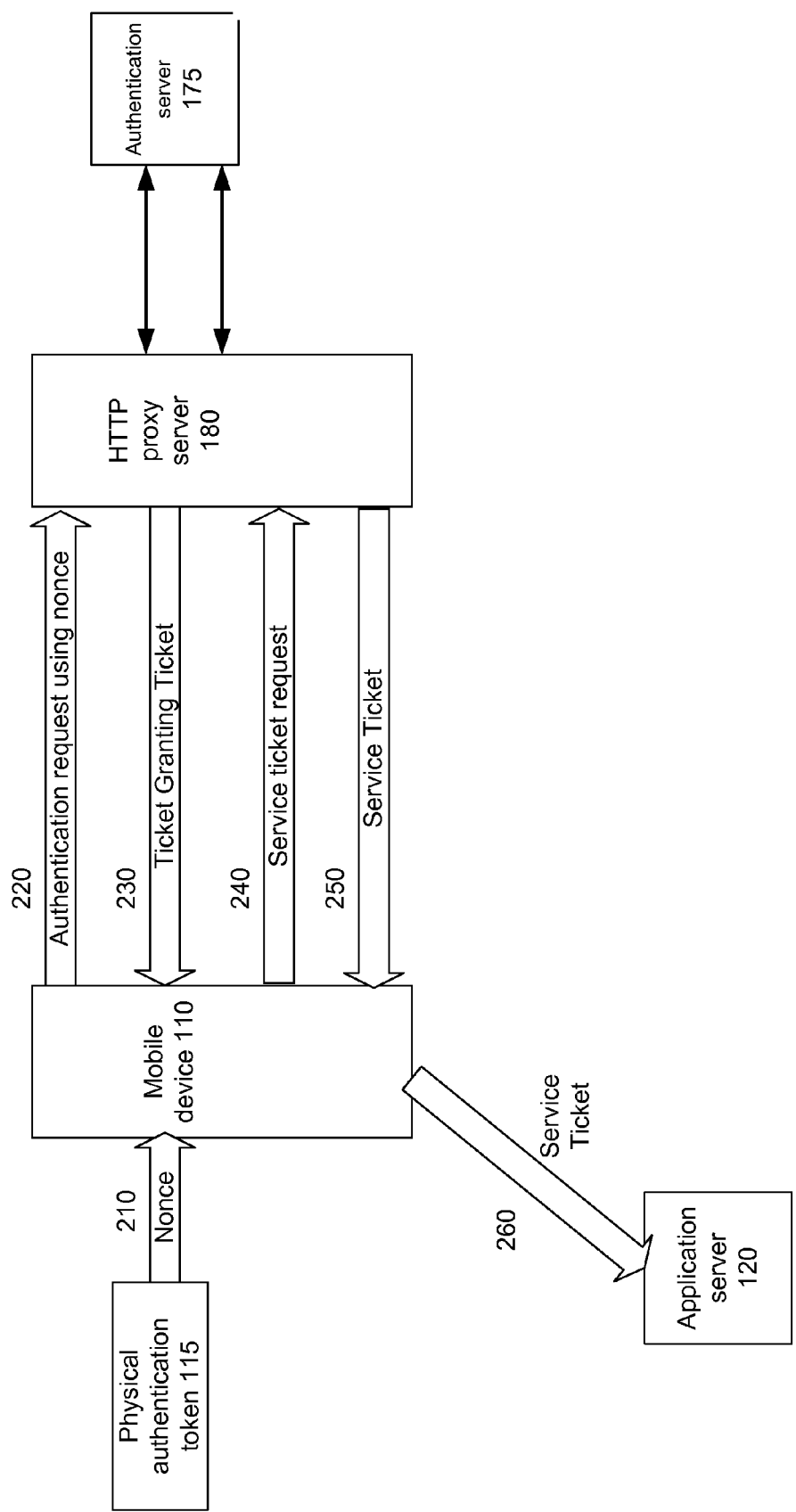
FIG. 2 schematically illustrates an example user authentication process, in accordance with one or more aspects of the present disclosure.

FIG. 2 schematically illustrates an example user authentication process in accordance with one or more aspects of the present disclosure. The user's mobile computing device 110 may, as a part of the user's login procedure, prompt the user to supply the authentication credentials (e.g., a user identifier and a password).

Responsive to a user's bringing physical authentication token 115 within the communication range of a near field communication (NFC) or other suitable communication interface (e.g., a Bluetooth interface or an infrared interface) of mobile computing device 110, the latter may receive a cryptographic nonce supplied by the physical authentication token, as schematically referenced by arrow 210.

Mobile computing device 110 may then transmit an authentication request 220 to an authentication server 175 (e.g., a Kerberos server) via HTTP proxy server 180. In certain implementations, the authentication request may comprise the cryptographic nonce received from the physical authentication token. Alternatively, the authentication request may comprise an entity derived from the cryptographic nonce (e.g., by applying a pre-defined function to the cryptographic nonce).

Responsive to receiving the client authentication request comprising a cryptographic nonce, authentication server 175 may validate the nonce. In an illustrative example, the nonce may be represented by a one-time password based on a secret shared by physical authentication token 115 and authentication server 175, so that the latter would be able to validate the nonce presented by the mobile computing device for authentication.

Authentication server 175 may respond to the client authentication request by transmitting a single sign-on authentication token, represented by ticket granting ticket (TGT) 230 back to mobile computing device 110 via HTTP proxy server 180. Responsive to receiving the TGT, mobile computing device 110 may use the TGT to acquire a resource access token, represented by service ticket (request-response exchange 240-250), for accessing a computing resource residing on enterprise network 140, such as an application server 120. In certain implementations, the single sign-on authentication token (e.g., represented by a TGT) and/or the resource access token (e.g., represented by a service ticket) may have defined expiration times.

Responsive to receiving the service ticket, mobile computing device 110 may transmit a resource access request 260 to application server 120, without requiring the user of the mobile computing device to provide any additional authentication-related input. In an illustrative example, mobile computing device 110 may access application server 120 via a mobile browser. Alternatively, one or more application-specific clients installed may be installed on mobile computing device 110 for accessing one or more application servers 120.

Thus, mobile computing device 110 may effectively be used for securely accessing computing resources residing within protected environments (e.g., internal network 142), without storing any long-term authentication keys on the mobile computing device, while providing strong user authentication and single sign-on to a plurality of protected computing resources.

While in the illustrative examples described herein with references to FIGS. 1-2, the authentication procedure performed by the mobile computing device and the authentication server conforms to Kerberos protocol, in other implementations, the authentication procedure may conform to another strong authentication protocol supporting the mechanism of acquiring authentication assertions and deriving or acquiring secondary credentials to access specific services via single sign-on.

Figure 3:
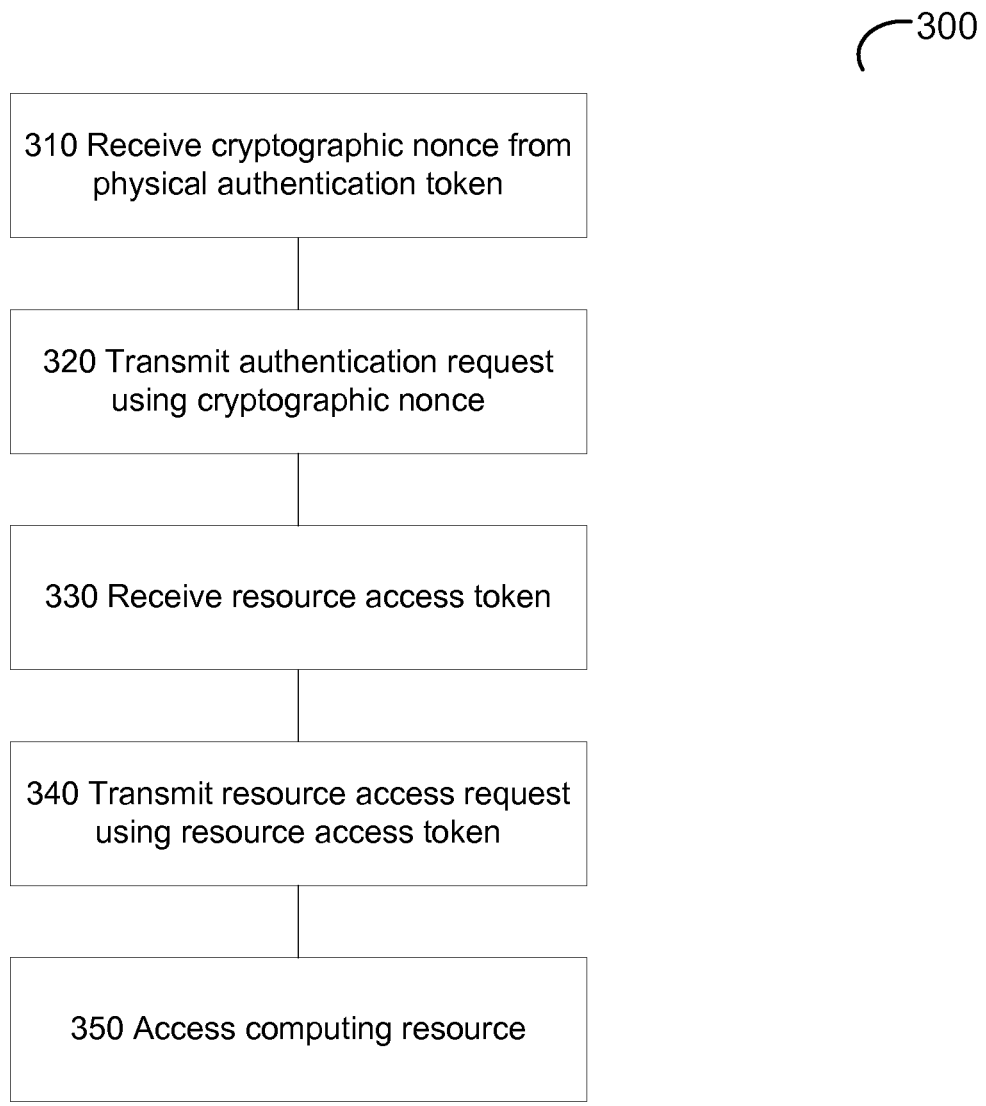
FIGS. 3-4 depict flow diagrams of example methods for strong user authentication by a mobile computing device for accessing computing resources residing on a protected network, in accordance with one or more aspects of the present disclosure.

FIG. 3 depicts a flow diagram of an example method 300 for strong user authentication by a mobile computing device for accessing computing resources residing on a protected network. Method 300 and/or each of its individual functions, routines, subroutines, or operations may be performed by one or more processors of a mobile computing device (e.g., mobile computing device 110 of FIG. 1) providing its user with the ability to access computing resources residing on a protected network (e.g., enterprise network 140 of FIG. 1). In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, responsive to a user's bringing a physical authentication token within the communication range of a near field communication (NFC) or other suitable communication interface of the mobile computing device, the latter may receive a cryptographic nonce supplied by the physical authentication token. In an illustrative example, the nonce may be represented by a one-time password based on a secret shared by the physical authentication token and an authentication server At block 320, the mobile computing device may transmit an authentication request to the authentication server. In certain implementations, the authentication request may comprise the cryptographic nonce received from the physical authentication token. Alternatively, the authentication request may comprise an entity derived from the cryptographic nonce (e.g., by applying a pre-defined function to the cryptographic nonce).

In certain implementations, the authentication request may be transmitted via an HTTP proxy server over a secure (SSL/TLS) connection. Alternatively, other application, transport and/or presentation layer protocols may be used for providing the client-server message exchange between the mobile computing device and the authentication server described herein.

In an illustrative example, the authentication procedure performed by the mobile computing device and the authentication server may conform to Kerberos protocol, as described in more details herein above. Alternatively, the authentication procedure may conform to another strong authentication protocol supporting the mechanism of acquiring authentication assertions and deriving or acquiring secondary credentials to access specific services via single sign-on.

Responsive to transmitting the authentication request, the mobile computing device may receive a single sign-on authentication token, represented by a ticket granting ticket (TGT), from the authentication server, and use the TGT to acquire service tickets to access other services via a single sign-on mechanism.

At block 330, the mobile computing device may receive a resource access token (e.g., represented by a Kerberos service ticket) from the authentication server, as described in more details herein above.

At block 340, the mobile computing device may transmit a service access request using the resource access token to an application server. In certain implementations, the service access request may comprise the resource access token (e.g., Kerberos service ticket). Alternatively, the service access request may comprise an entity derived from the resource access token (e.g., by presenting the resource access token to the authentication server or to a third party).

At block 350, the mobile computing device may access the requested computing resource. Responsive to completing operations references by block 350, method 300 may terminate.

Figure 4:
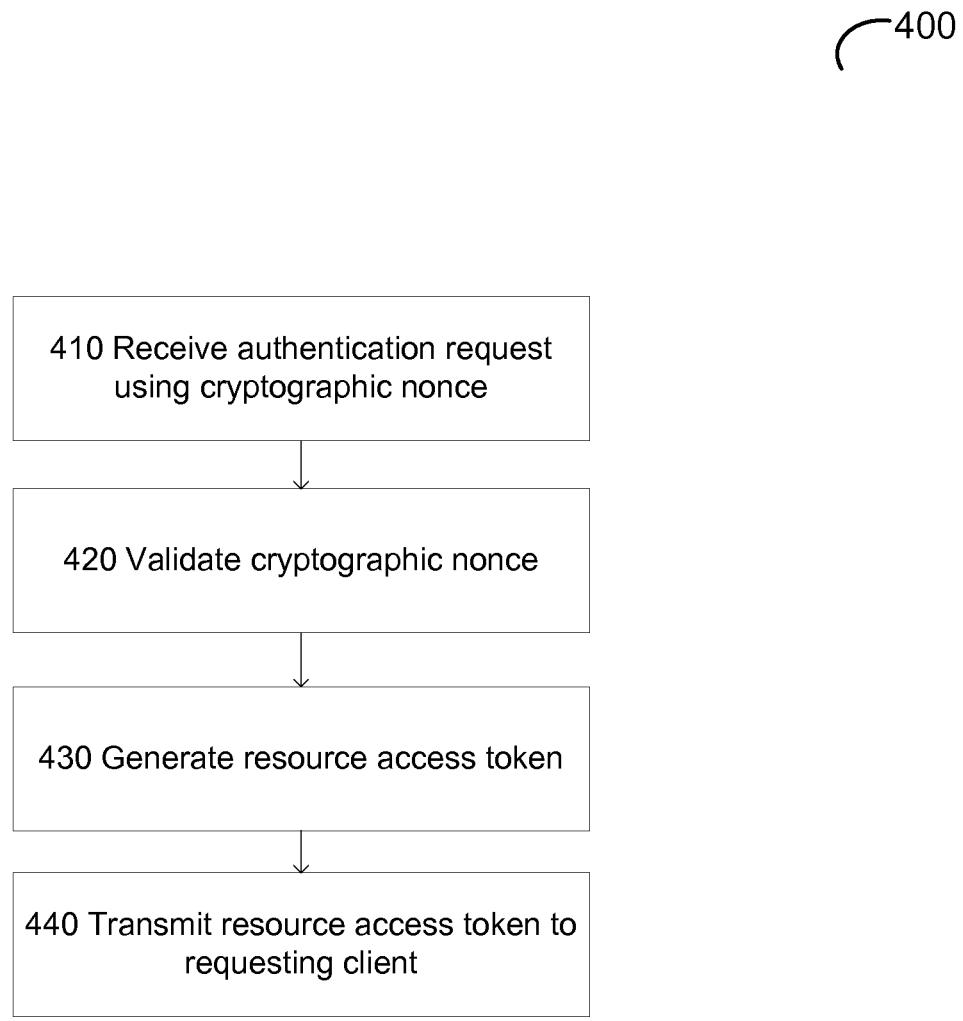

FIG. 4 depicts a flow diagram of an example method 400 for strong user authentication by a mobile computing device for accessing computing resources residing on a protected network. Method 400 and/or each of its individual functions, routines, subroutines, or operations may be performed by one or more processors of a server computer system (e.g., one or more computer systems of enterprise network 140 of FIG. 1). In an illustrative example, method 400 may be performed by a server computer system comprising an authentication server and an HTTP proxy server, as schematically illustrated by FIG. 1.

In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, the authentication server may receive, from a mobile computing device, an authentication request based on a cryptographic nonce. In certain implementations, the authentication request may comprise the cryptographic nonce. Alternatively, the authentication request may comprise an entity derived from the cryptographic nonce (e.g., by applying a pre-defined function to the cryptographic nonce). In an illustrative example, the nonce may be represented by a one-time password based on a secret shared by the nonce generating entity (e.g., a physical authentication token) and the authentication server, so that the latter would be able to validate the nonce presented by the mobile computing device for authentication.

In certain implementations, the authentication request may be transmitted via an HTTP proxy server over a secure (SSL/TLS) connection. Alternatively, other application, transport and/or presentation layer protocols may be used for providing the client-server message exchange between the mobile computing device and the authentication server described herein.

In an illustrative example, the authentication procedure performed by the mobile computing device and the authentication server may conform to Kerberos protocol, as described in more details herein above. Alternatively, the authentication procedure may conform to another strong authentication protocol supporting the mechanism of acquiring authentication assertions and deriving or acquiring secondary credentials to access specific services via single sign-on.

Responsive to validating the cryptographic nonce at block 420, the authentication server may, at block 430, generate a resource access token. In certain implementations, responsive to the authentication request, the authentication server may respond with a ticket granting ticket (TGT), which the client may then use to acquire service tickets to access other services via a single sign-on mechanism, as described in more details herein above. Hence, in an illustrative example, the resource access token may be provided by a service ticket.

At block 440, the authentication server may transmit the resource access token to the requesting mobile computing device. Responsive to completing operations references by block 440, method 400 may terminate.

Figure 5:
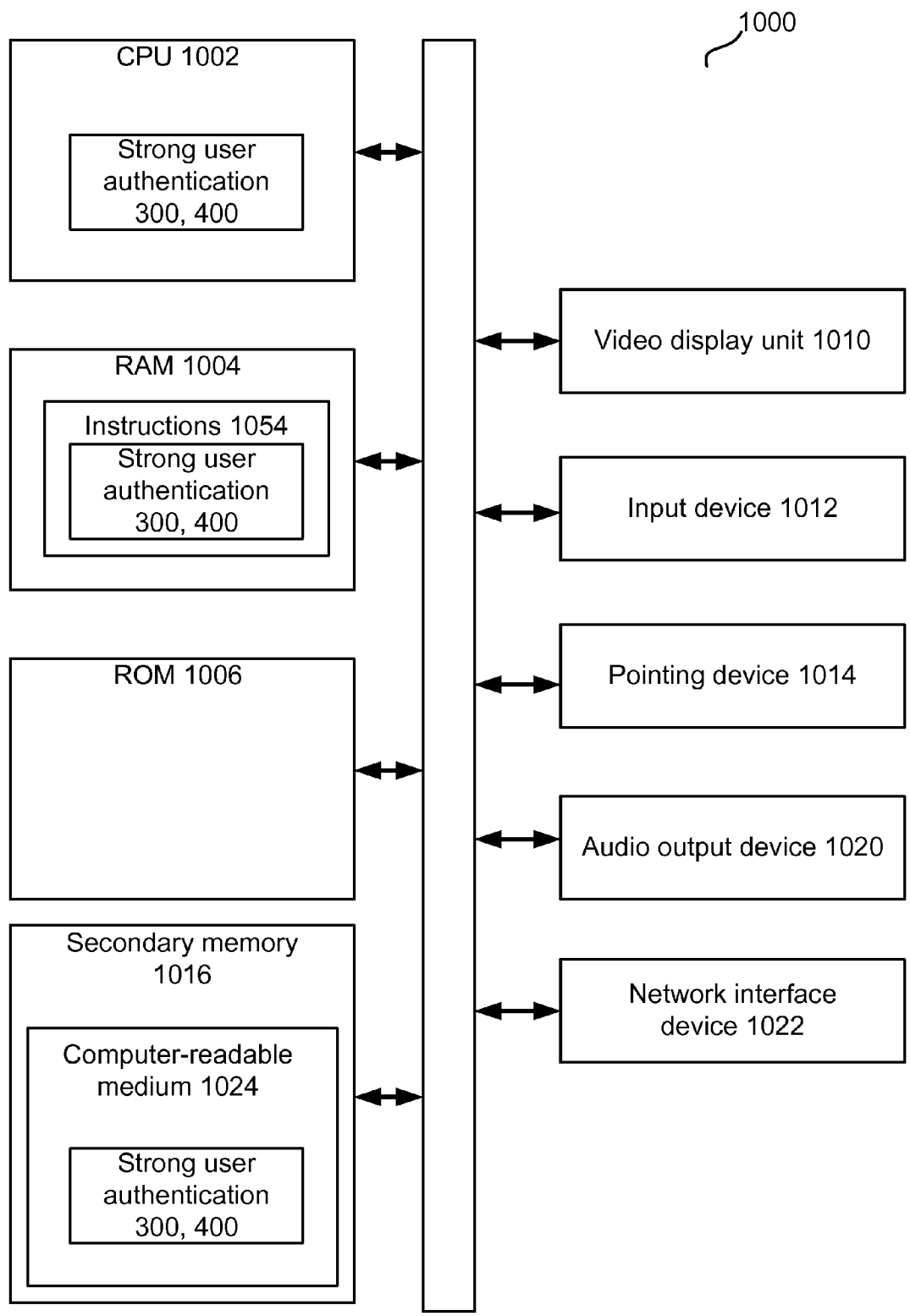
FIG. 5 depicts a block diagram of an illustrative computer system operating in accordance with examples of the present disclosure.

FIG. 5 depicts an example computer system 1000 within which a set of instructions, for causing the computer system to perform any one or more of the methods described herein, may be executed. In illustrative examples, the computer system 1000 may correspond to mobile computing device 110, application server 120, router 150, authentication server 175 and/or directory server 185 of FIG. 1.

In certain implementations, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" may include any collection of computers that individually or jointly execute a set (or multiple sets) of instructions to perform any one or more of the methods described herein.

In a further aspect, computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alpha-numeric input device 1012 (e.g., a keyboard), a pointing device 1014 (e.g., a mouse), and an audio output device 1020 (e.g., a speaker).

Secondary memory 1016 may include a non-transitory computer-readable storage medium 1024 on which may be stored instructions of methods 300 and/or 400 for strong user authentication by a mobile computing device for accessing computing resources residing on a protected network. Instructions of methods 300 and/or 400 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative example of FIG. 5 as a single medium, the term "computer-readable storage medium" may include a single medium or multiple media (e.g., a centralized or distributed database, and/or associated caches and servers) that store the one or more sets of executable instructions. The term "computer-readable storage medium" may also include any non-transitory medium that is capable of storing or encoding a set of instructions for execution by a computer that cause the computer to perform any one or more of the methods described herein. The term "computer-readable storage medium" may include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform functions, routines, subroutines, or operations of the methods described herein. The required structure for a variety of these systems will appear as set forth in the description above.

The above description is intended to be illustrative, and not restrictive. Although the present disclosure has been described with references to specific illustrative examples and implementations, it will be recognized that the present disclosure is not limited to the examples described. The scope of the disclosure should be determined with reference to the following claims, along with the full scope of equivalents to which the claims are entitled.

What is claimed is:

1. A method, comprising:
   receiving, by a processor of a mobile computing device, a cryptographic nonce from a physical authentication token via a first communication interface, wherein the cryptographic nonce is based on a secret shared by the physical authentication token and an authentication server;
   transmitting, by the processor, via a second communication interface, an authentication request using the cryptographic nonce, to an authentication server via a Hypertext Transfer Protocol (HTTP) proxy server;
   receiving a single sign-on authentication token from the authentication server;
   transmitting, to the authentication server, a resource access token request using the single sign-on authentication token;
   receiving a resource access token from the authentication server; and
   transmitting a computing resource access request using the resource access token.

2. The method of claim 1, further comprising:
   accessing, via the second communication interface, a computing resource referenced by the computing resource access request.

3. The method of claim 1, wherein the first communication interface is provided by at least one of: a near field communication (NFC) interface, a Bluetooth interface, or an infrared interface.

4. The method of claim 1, wherein the second communication interface is provided by a network communication interface.

5. The method of claim 1, wherein the authentication request conforms to Kerberos protocol.

6. The method of claim 1, wherein transmitting the authentication request is performed over a Secure Socket Layer (SSL) connection.

7. The method of claim 1, wherein the cryptographic nonce is provided by one of: a short-lived certificate or a one-time password.

8. A mobile computing device comprising:
   a memory; and
   a processor, operatively coupled to the memory, to:
      receive a cryptographic nonce from a physical authentication token via a first communication interface, wherein the cryptographic nonce is based on a secret shared by the physical authentication token and an authentication server;
      transmit, via a second communication interface, an authentication request using the cryptographic nonce, to an authentication server via a Hypertext Transfer Protocol (HTTP) proxy server;
      receive a single sign-on authentication token from the authentication server;
      transmit, to the authentication server, a resource access token request using the single sign-on authentication token;
      receive a resource access token from the authentication server; and
      transmit a computing resource access request using the resource access token.

9. The mobile computing device of claim 8, wherein the processor is further to:
   access, via the second communication interface, a computing resource referenced by the computing resource access request.

10. The mobile computing device of claim 8, wherein the first communication interface is provided by at least one of: a near field communication (NFC) interface, a Bluetooth interface, or an infrared interface.

11. The mobile computing device of claim 8, wherein the second communication interface is provided by a network communication interface.

12. The mobile computing device of claim 8, wherein the authentication request conforms to Kerberos protocol.

13. The mobile computing device of claim 8, wherein the cryptographic nonce is provided by one of: a short-lived certificate or a one-time password.

14. A computer-readable non-transitory storage medium comprising executable instructions to cause a processor to:
   receive, by the processor, a cryptographic nonce from a physical authentication token via a first communication interface, wherein the cryptographic nonce is based on a secret shared by the physical authentication token and an authentication server;
   transmit, via a second communication interface, an authentication request using the cryptographic nonce, to an authentication server via a Hypertext Transfer Protocol (HTTP) proxy server;
   receive a single sign-on authentication token from the authentication server;
   transmit, to the authentication server, a resource access token request using the single sign-on authentication token;
   receive a resource access token from the authentication server; and
   transmit a computing resource access request using the resource access token.

15. The computer-readable non-transitory storage medium of claim 14, further comprising executable instructions to cause the processor to:

access, via the second communication interface, a computing resource referenced by the computing resource access request.

16. The computer-readable non-transitory storage medium of claim 14, wherein the first communication interface is provided by at least one of: a near field communication (NFC) interface, a Bluetooth interface, or an infrared interface.

17. The computer-readable non-transitory storage medium of claim 14, wherein the cryptographic nonce is provided by one of: a short-lived certificate or a one-time password.

\* \* \* \* \*